United States Patent [19]

Ikenoya et al.

[11] Patent Number: 4,476,676
[45] Date of Patent: Oct. 16, 1984

[54] SECONDARY AIR SUPPLY CONTROL DEVICE FOR EXHAUST GAS PURIFYING APPARATUS OF INTERNAL COMBUSTION ENGINES

[75] Inventors: Yasuo Ikenoya, Kawagoe; Yoichi Ishida, Niiza, both of Japan

[73] Assignee: Honda Giken Kogyo Kabushiki Kaisha, Tokyo, Japan

[21] Appl. No.: 397,927

[22] Filed: Jul. 13, 1982

[30] Foreign Application Priority Data

Jul. 15, 1981 [JP] Japan ................................ 56-110573

[51] Int. Cl.³ .......................... F02B 75/10; F01N 3/22
[52] U.S. Cl. ........................................ 60/290; 60/293
[58] Field of Search ................... 60/284, 289, 290, 293

[56] References Cited

U.S. PATENT DOCUMENTS

| | | | |
|---|---|---|---|
| 3,805,522 | 4/1974 | Sheppard | 60/290 |
| 3,849,984 | 11/1974 | Toda | 60/290 |
| 3,919,843 | 11/1975 | Arnaud | 60/289 |
| 4,222,237 | 9/1980 | Kohama | 60/290 |

FOREIGN PATENT DOCUMENTS 49520 4/1980 Japan ..................................... 60/289

*Primary Examiner*—Douglas Hart
*Attorney, Agent, or Firm*—Armstrong, Nikaido, Marmelstein & Kubovcik

[57] ABSTRACT

Herein disclosed is a secondary air supply control device for use with an apparatus for purifying an exhaust gas of an internal combustion engine. In the exhaust gas purifying apparatus, a secondary air supply system is made to communicate with the exhaust system of the internal combustion engine so that secondary air may be supplied during the running operation of the internal combustion engine to said exhaust system thereby to oxidize and clear the unburned noxious content of said exhaust system. The secondary air supply control device comprises a vacuum-operated secondary air control valve which is disposed midway of said secondary air supply system for controlling the flow rate of the secondary air to be supplied to said exhaust system; and means for controlling said vacuum-operated secondary air control valve during the deceleration and the choking operation at the start of said engine so that the supply of the secondary air to said exhaust system is interrupted.

6 Claims, 3 Drawing Figures

SECONDARY AIR SUPPLY CONTROL DEVICE FOR EXHAUST GAS PURIFYING APPARATUS OF INTERNAL COMBUSTION ENGINES

BACKGROUND OF THE INVENTION

1. Field of the Invention

The present invention relates to an exhaust gas purifying apparatus for supplying reburning secondary air to the exhaust system of an internal combustion engine thereby to oxidize and clear the unburned noxious content such as hydrocarbons (HC) or carbon monoxide (CO) of the engine exhaust gas, and, more particularly, to a secondary air supply control device for use with the engine exhaust gas purifying apparatus, in which the flow rate of the secondary air to be supplied is properly controlled in accordance with the running state of the internal combustion engine thereby to ensure the effective purification of the exhaust gas and to prevent an abnormal combustion such as the afterburning phenomena from occurring and the exhaust pipe and/or the exhaust muffler of the exhaust system from allowing its surface to be discolored or to lose its gloss due to the excessive heating.

2. Description of the Prior Art

In the deceleration of an internal combustion engine, generally speaking, the unburned content in the exhaust gas has a tendency to be increased due to the reduction in the flow rate of intake air. If, in this state, excessive secondary air for the exhaust gas purification is supplied, that unburned content may be instantly burned to invite disadvantages that the so-called "afterburning phenomena" may be invited, that the exhaust pipe and/or the exhaust muffler may be heated to accelerate the discoloration or the loss of the gloss of its surface, and that the deterioration of a catalytic converter may be promoted.

When in the choking operation at the start of the internal combustion engine, moreover, the air-fuel ratio of the combustible mixture sucked has a tendency to be shifted to a rich side, and this tendency is promoted, in case the idling operation is continued for a long time while being left in the choking operation, thereby to allow the unburned content to be more discharged. This case is also accompanied by the same disadvantage as that during the aforementioned deceleration.

SUMMARY OF THE INVENTION

It is, therefore, a major object of the present invention to provide a secondary air supply control device of the aforementioned kind having a simple construction, in which the supply of the secondary air to the exhaust system is interrupted during the deceleration and during the choking operation at the start of the engine thereby to eliminate the aforementioned disadvantages.

Another object of the present invention is to provide a secondary air supply control device of the aforementioned type, in which the response to an intake vacuum is excellent to ensure the supply and block of the secondary air and to have smooth and quiet opening and closing operations.

The above and other objects, features and advantages of the present invention will become apparent from the following detailed description of a preferred embodiment when taken in conjunction with the accompanying drawings.

DESCRIPTION OF THE PREFERRED EMBODIMENT

The present invention will be described in the following with reference to the accompanying drawings in connection with an emboidment in which the present invention is applied to an internal combustion engine for a motorcycle.

Figure 1:
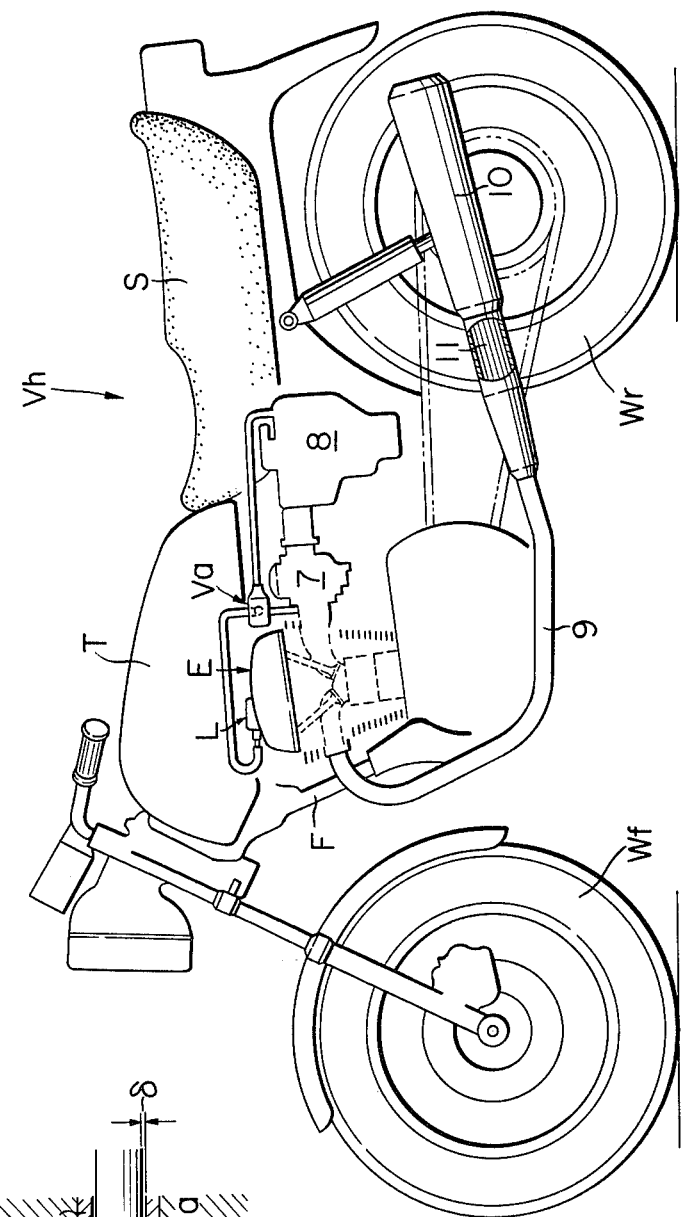
FIG. 1 is a schematic side elevation showing a motorcycle on which an internal combustion engine equipped with a secondary air control valve according to the present invention is mounted.

In FIG. 1, a fuel tank T and a seat S are mounted on the upper portion of a body frame F of a motorcycle Vh, and front and rear wheels Wf and Wr are suspended from the front and back of those fuel tank and seat T, S. In the space defined by those components, an internal combustion engine E for driving the rear wheel Wr is mounted transversely on the body frame F.

Figure 2:
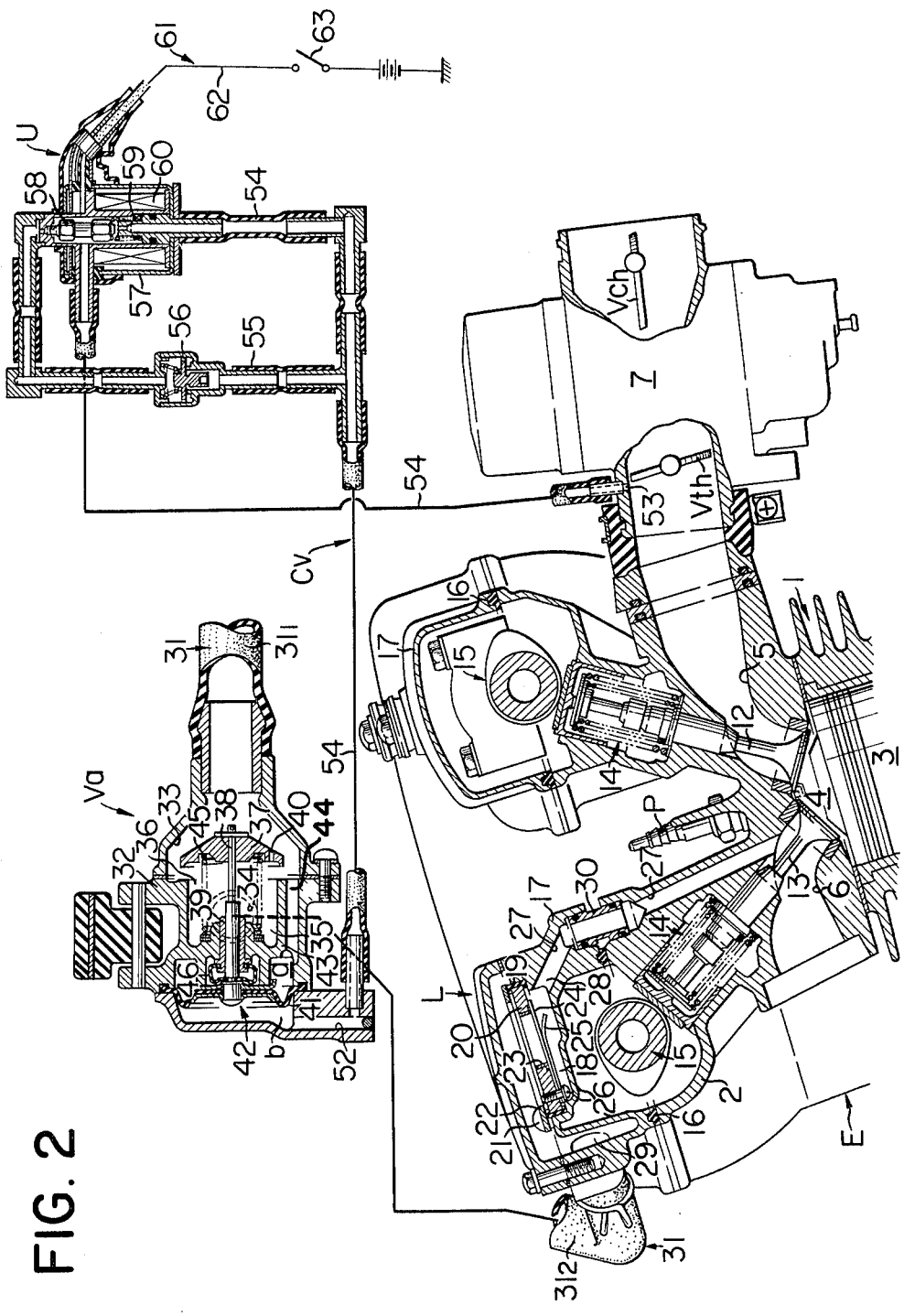
FIG. 2 is a vertically sectional side elevation showing an essential portion of the aforementioned internal combustion engine.

In FIG. 2, an engine body 1 has its cylinder head 2 formed at its rear half with an intake port 5, which has communication with a combustion chamber 4 defined above a piston 3, and at its front half with an exhaust port 6, which has communication with the aforementioned combustion chamber 4, such that the aforementioned intake port 5 is opened in the rear side of the engine body 1 whereas the exhaust port 6 is opened in the front side of the engine body 1. With the intake port 5, there is connected, as shown in FIG. 1, an intake system which is composed of a carburetor 7, an air cleaner 8 and so on arranged at the back of the engine body 1. With the aforementioned exhaust port 6, there is connected an exhaust system which is composed of an exhaust pipe 9, an exhaust muffler 10 and so on. Midway of the exhaust muffler 10, there is disposed a catalytic converter 11 which is made operative to purify the engine exhaust gas. On the other hand, the cylinder head 2 is equipped as customary with intake and exhaust valves 12 and 13 which are made operative to open and close the open ends of the intake and exhaust ports 5 and 6 at the side of the combustion chamber 4 and which are actuated by the coactions of valve springs 14 and valve actuating mechanisms 15. The cylinder head 2 is further equipped with a spark plug P which is interposed between the intake and exhaust valves 12 and 13.

A head cover 17, which covers the exhaust valve 13 of the aforementioned cylinder head 2 through a packing member 16, is equipped with a reed valve mechanism L of the type which responds to the pulsing pressure in the exhaust gas.

The head cover 17 is formed with a valve chamber 18, in which a reed valve member 20 is disposed through a refractory packing 19. That reed valve member 20 is fixed to the head cover 17 through a mounting plate 22 by means of a mounting screw 21. The reed valve member 20 is formed with a valve hole 23 having a lower side, to which there are fixed by means of a mounting screw 26 both a reed 24 for opening and closing that valve hole 23 and a reed stopper 25 for restricting the opening of that reed 24.

The cylinder head 2 and the head cover 17 of the engine body 1 are formed with a secondary air passage 27 which extend thereover such that its upper end communicates with the outlet port 28 of the valve chamber 18 of the aforementioned reed valve mechanism L whereas its lower end comminucates with the exhaust port 6 in the vicinity of the exhaust valve 13.

On the other hand, the secondary air passage 27 extending over the cylinder head 2 and the head cover 17 has its midway hermetically connected, when it is assembled, to a connecting tube 30, which is also used as a guide member when the cylinder head 2 and the head cover 17 are assembled.

With an inlet port 29 which is opened into the valve chamber 18 of the aforementioned reed valve mechanism L, there communicates a secondary air supply passage 31 which in turn communicates with the cleaning chamber of the aforementioned air cleaner 8.

The vacuum, which is built up by the exhaust pulsations in the exhaust port 6 when the engine E is run, can intermittently open the reed 24 thereby to introduce the secondary air from the air cleaner 8 into the exhaust port 5 by way of the secondary air supply passage 31, the reed valve mechanism L and the secondary air passage 27.

Midway of the aforementioned secondary air supply passage 31, there is disposed a secondary air control valve Va which is made operative to control the flow rate of the secondary air to be supplied to the exhaust port 6.

That secondary air control valve Va has such a construction as will be described in the following. The secondary air control valve Va is supported in a suitable position on the body frame F of the motorcycle. The secondary air control valve Va has its valve housing 32 formed with an entrance passage 33, with which the upstream side passage $31_1$ of the secondary air supply passage 31 leading to the air cleaner 8 is connected, and an exit passage with which the downstream side passage $31_2$ of the secondary air supply passage 31 leading to the aforementioned reed valve mechanism L is connected. In the valve housing 32, there is formed a valve chamber 35 which is made operative to provide the communication between the entrance and exit passages 33 and 34. In the valve housing 32, moreover, there is disposed a valve member 37 which is made operative to open and close the valve port 36 of the valve chamber 35. A valve stem 38, which is connected to that valve member 37, is so supported that it can extend to slide back and forth in the guide hole 39a of a bearing 39 mounted in the valve housing 32. At this time, a gap δ between that valve stem 38 and the guide hole 39a is so set that the valve stem 38 can slide back and forth smoothly with little resistance. Between the wall of the valve chamber 35 and the valve member 37, there is sandwiched under compression a valve spring 45 which has such an elastic force as biases the valve member 37 to be opened.

On the other hand, the valve member 37 is formed with a leak hole 40, through which more or less secondary air is allowed, even when the valve member 37 is closed, to be supplied through the secondary air control valve Va to the exhaust port 6.

The valve housing 32 is formed at one side of the valve chamber 35 with a diaphragm actuating chamber 42, which is divided into an atmospheric chamber a and a vacuum chamber b by means of a diaphragm 41 mounted under tension in said chamber 42. The aforementioned valve stem 38 has its one end protruding into the diaphragm actuating chamber 42 until it is connected to the diaphragm 41. The atmospheric chamber a is vented to the atmosphere at all times via an atmospheric passage 44, which is formed in the valve wall 43 of the valve housing 32, whereas the aforementioned vacuum chamber b is made to communicate via a vacuum circuit Cv with the intake passage downstream of the throttle valve Vth of the carburetor 7 so that it receives the intake vacuum downstream of the throttle valve Vth.

Figure 3:
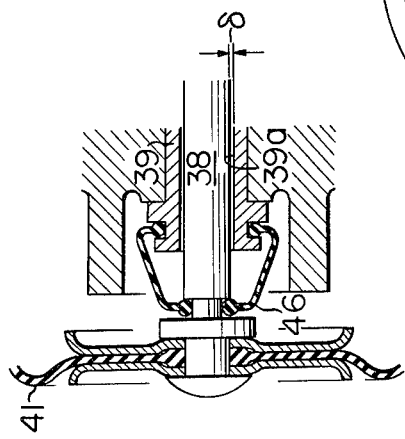
FIG. 3 is an enlarged view showing a portion of FIG. 2.

As more clearly seen from FIG. 3, in the atmospheric chamber a, there are hermetically jointed to the end portions of the aforementioned bearing 39 and the aforementioned valve stem 38 both the ends of a boot 46 which is made of an elastic material such as rubber or a synthetic resin and by which the aforementioned atmospheric chamber a is hermetically isolated from the valve chamber 35 thereby to prevent the air to pass through the gap δ between the bearing 39 and the valve stem 38 from flowing into the atmospheric chamber a.

Midway of the vacuum circuit Cv, there is disposed a control unit U which is made operative to close the aforementioned secondary air control valve Va during the operation of the choke valve Vch of the carburetor 7 or during the deceleration which is effected as a result that the opening of the throttle valve Vth of the carburetor 7 is reduced. That control unit U has such a construction as will be described in the following. In the description to be made, the vacuum circuit Cv has its upstream side located at the side of the intake passage of the carburetor 7 for providing the vacuum source and its downstream side located at the side of the vacuum chamber b to be supplied with the vacuum. The aforementioned vacuum circuit Cv is composed of: a main vacuum circuit 54 for providing the communication between a vacuum intake port 52, which is opened into the vacuum chamber b of the secondary air control valve Va, and a vacuum intake port 53, which is opened into the intake passage downstream of the throttle valve Vth of the carburetor 7; and an auxiliary vacuum circuit 55 for bypassing that main vacuum circuit 54. A check valve 56 is disposed midway of the auxiliary vacuum circuit 55. That check valve 56 is so set as to allow the passage of the vacuum only from the upstream side to the downstream i.e., only from the carburetor 7 to the secondary air control valve Va and as to have a relatively low valve pressure in terms of a vacuum level. At the merging portion of the main vacuum circuit 54 and the auxiliary vacuum circuit 55 upstream of the check valve 56, there is disposed a change-over valve 57 of electromagnetic type. This change-over valve 57 is made operative to selectively and interchangeably open and close the main and auxiliary vacuum circuits 54 and 55 and is constructed to include, in its valve housing; a valve member 58 which is enabled to alternately open and close the open ends of the main and auxiliary vacuum circuits 54 and 55; a valve spring 59 for biasing that valve member 58 in a direction (i.e., upward, as viewed from FIG. 2) to close the auxiliary vacuum circuit 55; and a solenoid 60 for biasing the aforementioned valve member 58 against the elastic force of the valve spring 59 in a direction (i.e., downward, as viewed from FIG. 2) to close the main vacuum circuit 54. That solenoid 60 is connected to a controller 61 by which it is operated. This controller 61 is constructed of a choke switch 63 which is disposed midway of an electric power source circuit 62 connected with the aforementioned solenoid 60. That choke switch 63 is adapted to be closed when the choke valve Vch of the carburetor 7 is closed.

The operations of the embodiment of the present invention will be described in the following.

[Choking Operation of Engine]

In order to speed up the warming-up operation at the cold start of the engine E, the choking operation is performed to close the choke valve Vch, and the choke switch 63 is closed especially in the choked state. As a result, the solenoid 60 is energized to magnetize the electromagnetic type change-over valve 57 so that the valve member 58 is attracted downwardly of FIG. 2 to open the auxiliary vacuum circuit 55. When the vacuum in the auxiliary vacuum circuit 55 is built up to a high level, the check valve 56 is opened so that a high vacuum is gradually accumulated in the vacuum chamber b. When this high vacuum exceeds a predetermined level (e.g., 450 mmHg), the diaphragm 41 is sucked and shifted leftwardly of FIG. 2 until the valve member 37 shuts off the valve port 36. In this case, the minimum necessary secondary air is supplied from the leak hole 40 of the valve member 37 through the secondary air control valve Va and via the secondary air supply passage 31 to the exhaust port 6. However, this promotes the combustion of the unburned content at most but raises no fear that the substantial purification of the exhaust gas is effected by the secondary air thereby to cause the afterburning phenomena.

[Deceleration of Engine]

After the choking operation at the start of the engine, the choke switch 63 is opened to deenergize the solenoid 60 of the electromagnetic type changeover valve 57 so that the valve member 58 is pushed upwardly of FIG. 2 by the elastic force of the valve spring 59. As a result, simultaneously as the auxiliary vacuum circuit 55 is closed, the main vacuum circuit 54 is opened. On the other hand, the throttle valve Vth of the carburetor 7 has such a small opening that the high intake vacuum (which is higher than 450 mmHg) downstream of said throttle valve Vth is exerted through the main vacuum circuit 54 upon the vacuum chamber b thereby to suck and shift the diaphragm 41 leftwardly of FIG. 2 similarly to the aforementioned choking operation. As a result, the valve member 37 closes the valve port 36 so that the secondary air for the exhaust purification is not substantially supplied to the exhaust port 6.

[Normal Running Operation of Engine]

When the internal combustion engine E is brought into its normal running range so that the intake vacuum is lowered, the vacuum to be introduced into the vacuum chamber b is accordingly lowered so that the diaphragm 41 is shifted to the right, as viewed from FIG. 2, by the elastic force of the valve spring 45. Then, the valve member 37 connected thereto is also shifted to the right so that the secondary air supply passage 31 is brought into its communicating state to vent the reed valve mechanism L to the atmosphere through the air cleaner 7.

In the meanwhile, the exhaust pulsating pressure to be generated as a result of the running operation of the internal combustion engine E is introduced via the secondary air passage 27 into the reed valve mechanism L thereby to open the same so that the clean air coming from the air cleaner 8 is introduced via the secondary air supply passage 31 and through the secondary air control valve Va in its open state, as has been described hereinbefore, into the reed valve mechanism L, from which it is further introduced via the secondary air passage 27 into the exhaust port 6.

The secondary air thus introduced into the exhaust port 6 is mixed with the exhaust gas thereby to oxidize and clear the unburned content such as HC or CO of the exhaust gas prevailing in the exhaust port 6 and in the exhaust pipe 9. Moreover, the exhaust gas mixed with that secondary air flows into the exhaust muffler 10 thereby to promote the reactions in the catalytic converter 11 mounted therein so that the unburned noxious content therein is liberated into the atmosphere after it has been purified.

In the aforementioned operations of the secondary air control valve Va, when the intake vacuum downstream of the throttle valve Vth is exerted upon the vacuum chamber b of the diaphragm actuating chamber 42 to suck the diaphragm 41 so that the valve member 37 may be closed, the clean secondary air can be sucked with less resistance from upstream of the valve member 37 into the atmospheric chamber a via the atmospheric passage 44 formed in the valve wall 43 of the valve housing 32 thereby to smoothen and ensure the operations of the diaphragm 41 and the valve stem 38 connected to the diaphragm 41 so that the response of the secondary air control valve Va can be made excellent.

Moreover, since it is not necessary to provide a separate piping or a separate filter so as to supply the aforementioned atmospheric chamber a with the ambient air, the number of parts inclusive can be reduced, and the construction can be simplified. As a result, the cost can be remarkably reduced, and the device can be made compact as a whole. Still moreover, the number of the brittle portions or the parts to be replaced can be reduced to enhance the durability of the device.

Here, the secondary air control valve Va for controlling the supply of the secondary air to the exhaust port 6 is controlled to be opened and closed in response to the intake vacuum, as has been described hereinbefore. However, let it be assumed that the secondary air control valve Va is not equipped with the boot 46 which hermetically seals the gap between the atmospheric chamber a and the valve chamber 35 downstream of the valve member 37. In a state in which the opening of the throttle valve Vth of the engine E is so small that the valve member 37 is forced to close the valve port 36 by the vacuum in the vacuum chamber b, the high vacuum from the engine E is exerted through the reed valve mechanism upon the inside of the valve chamber 35 downstream of the valve member 37 so that a high vacuum is built up in that valve chamber 35. Moreover, that high vacuum is also exerted upon the atmospheric chamber a through the gap δ (which is necessary for smoothening the sliding movement of the valve stem 38) between the guide hole 39a and the valve stem 38 so that the atmosphere is sucked by that high vacuum by way of the atmospheric passage 44, the atmospheric chamber a and the aforementioned gap δ into the valve chamber 35, from which it further flows through the reed valve mechanism L into the exhaust port 6. As a result, the desired cutting operation of the secondary air cannot be effected to invite a disadvantage that the preventing effect of the afterburning phenomena during the deceleration is deteriorated. Moreover, if the aforementioned gap δ is enlarged to reduce the frictional resistance of the valve stem step 38 with a view to improving the response of the secondary air control valve Va, the flow rate of the atmosphere to be sucked into the valve chamber 35 is accordingly increased to further promote the aforementioned disadvantage.

Furthermore, in case the aforementioned atmospheric chamber a is made relatively large so that it is not vented to the atmosphere, i.e., in case the atmospheric passage 44 need not be provided, there is a tendency that a vacuum is established in said atmospheric chamber a so that the vacuum established acts to return the diaphragm 41 to its original position thereby to weaken the valve closing force of the valve member 37. Moreover, when the secondary air begins to flow, the vacuum in the valve chamber 35 downstream of the valve member 37 is lowered. As a result, the diaphragm 41 is sucked again by the intake vacuum in the vacuum chamber b to close the valve member 37. Thus, the slightly hunting operations for opening and closing the valve member 37 are repeated to raise another disadvantage that noises are caused.

According to the present invention, however, the disadvantages thus far described can be eliminated. Specifically, by hermetically blocking the communication between the valve chamber 35 downstream of the valve member 37 and the atmospheric chamber a, a vacuum is not exerted upon the atmospheric chamber a, even if it is built up in the valve chamber 35 when the valve member 37 is closed. As a result, when the valve member 37 is closed, the secondary air does not flow through the secondary air supply passage 31 (in fact, however, a little secondary air flows through the leak hole 40,) thereby to ensure the prevention of the afterburning phenomena during the deceleration of the engine and to prevent the valve member 37 from being opened and closed with a small stroke, whereby the resultant noises are eliminated.

Moreover, the gap δ between the valve stem 38 and the guide hole 39a can be enlarged to smoothen the reciprocal sliding motions of the valve stem 38 so that the response of the secondary air control valve Va can be remarkably improved.

As has been described hereinbefore, according to the present invention, there is disposed midway of the secondary air supply system communicating with the exhaust system of the engine the secondary air control valve which is closed, during the choking operation of the engine and during the deceleration of the same, to supply the exhaust system with little secondary air. As a result, it is possible to prevent the afterburning phenomena due to the excessive supply of the secondary air and to prevent the exhaust pipe and/or the exhaust muffler of the exhaust system from allowing its surface to be discolored or to lose its gloss due to the excessive heating thereby to maintain the decorative values of those exhaust pipe and muffler. Furthermore, the catalyzer disposed in the exhaust system can be suppressed an excessive rise of its reaction temperature so that its deterioration is not promoted.

Furthermore, the aforementioned secondary air control valve is enabled by the single change-over valve to be closed for the two systems, i.e., during the choking operation and the deceleration of the engine so that the whole construction of the secondary air control device can be simplified and made compact.

What is claimed is:

1. In an apparatus for purifying exhaust gas of an internal combustion engine, in which a secondary air supply system, is made to communicate with an exhaust system of the internal combustion engine so that secondary air may be supplied during running operation of the internal combustion engine to said exhaust system thereby to oxidize the unburned noxious content in said exhaust system, a secondary air supply control device comprising:

a vacuum-operated secondary air control valve disposed midway of said secondary air supply system for controlling the flow rate of secondary air to be supplied to said exhaust system, control means for controlling said vacuum-operated secondary air control valve by intake vacuum during deceleration and choking operation at the time of starting of said engine so that supply of the secondary air to said exhaust system is interrupted, said control means including a main vacuum circuit for producing communication between said secondary air control valve and the intake system of said internal combustion engine, an auxiliary vacuum circuit bypassing said main vacuum circuit; and a change-over valve interposed between said main vacuum circuit and said auxiliary vacuum circuit for interchangeably opening and closing said main and auxiliary vacuum circuits in response to an operative condition of the engine including deceleration and the choking operation.

2. A secondary air supply control device as set forth in claim 1, wherein said control means further includes:

a check valve disposed midway of said auxiliary vacuum circuit and downstream of said change-over valve, said check valve being adapted to open when the vacuum in said auxiliary vacuum circuit becomes lower on the side of said secondary air control valve than the side of said intake system to allow the flow of vacuum from the intake system to the secondary air control valve for maintaining the vacuum on the side of the control valve at maximum level and a controller responsive to the choking operation of said engine for switching said change-over valve to open said auxiliary vacuum circuit.

3. A secondary air supply control device as set forth in claim 1, wherein said main vacuum circuit communicates between a vacuum chamber of said secondary air control valve and intake passage of said intake system downstream of the throttle valve of a carburetor.

4. A secondary air supply control device as set forth in claim 1, wherein said vacuum-operated secondary air control valve includes: a valve housing formed with a guide hole; a valve chamber defined in said valve housing and communicating with said secondary air supply system; a valve member disposed in said valve housing for establishing and blocking the communication between said secondary air supply system and said valve chamber; a diaphragm actuating chamber defined in said valve housing; a diaphragm partitioning said diaphragm actuating chamber into an atmospheric chamber vented to the atmosphere and a vacuum chamber communicating with a vacuum source; and a valve stem having its one end connected to said valve member and its other end extending slidably in the guide hole of said valve housing to protrude into said diaphragm actuating chamber until it is connected to said diaphragm.

5. A secondary air supply control device as set forth in claim 4, wherein said vacuum-operated secondary air control valve further includes a flexible boot interposed between said valve stem and said valve housing and hermetically blocking the communication between said valve chamber and said atmospheric chamber.

6. A secondary air supply control device as set forth in claim 4 or 5, wherein said vacuum-operated secondary air control valve further includes an atmospheric passage formed in said valve housing for providing communication between said atmospheric chamber and said secondary air supply system upstream of said valve member.

* * * * *